US010185711B1

(12) United States Patent
Shires et al.

(10) Patent No.: US 10,185,711 B1
(45) Date of Patent: *Jan. 22, 2019

(54) SPEECH RECOGNITION AND SUMMARIZATION

(71) Applicant: Google LLC, Mountain View, CA (US)

(72) Inventors: Glen Shires, Danville, CA (US); Sterling Swigart, Mountain View, CA (US); Jonathan Zolla, Belmont, CA (US); Jason J. Gauci, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,039

(22) Filed: Jul. 5, 2016

Related U.S. Application Data (63) Continuation of application No. 14/078,800, filed on Nov. 13, 2013, now Pat. No. 9,420,227, which is a
(Continued)

(51) Int. Cl.
*G06F 17/27* (2006.01)
*G10L 15/26* (2006.01)
(Continued)

(52) U.S. Cl.
CPC .......... *G06F 17/2765* (2013.01); *G10L 15/26* (2013.01); *G10L 21/10* (2013.01); *H04N 7/15* (2013.01)

(58) Field of Classification Search
CPC ......... G10L 15/26; G10L 17/22; G10L 15/22; G10L 25/48; G10L 15/265; G10L 15/30;
(Continued)

(56) References Cited

U.S. PATENT DOCUMENTS

| 6,185,527 B1 | 2/2001 | Petkovic et al. |
| 6,546,405 B2 | 4/2003 | Gupta et al. |

(Continued)

FOREIGN PATENT DOCUMENTS

SG   2002093414   11/2002

OTHER PUBLICATIONS

Office Action issued in U.S. Appl. No. 13/743,838 dated May 21, 2013, 15 pages.
(Continued)

*Primary Examiner* — Edgar X Guerra-Erazo
(74) *Attorney, Agent, or Firm* — Honigman Miller Schwartz and Cohn LLP (57) ABSTRACT

The subject matter of this specification can be embodied in, among other things, a method that includes receiving two or more data sets each representing speech of a corresponding individual attending an internet-based social networking video conference session, decoding the received data sets to produce corresponding text for each individual attending the internet-based social networking video conference, and detecting characteristics of the session from a coalesced transcript produced from the decoded text of the attending individuals for providing context to the internet-based social networking video conference session.

17 Claims, 6 Drawing Sheets

Related U.S. Application Data continuation of application No. 13/743,838, filed on Jan. 17, 2013, now Pat. No. 8,612,211.

(60) Provisional application No. 61/699,072, filed on Sep. 10, 2012.

(51) Int. Cl.
*G10L 21/10* (2013.01)
*H04N 7/15* (2006.01)

(58) Field of Classification Search
CPC ....... G10L 13/00; G10L 15/00; G10L 17/005;
G10L 13/027; G10L 13/033; G10L 15/07;
G10L 15/28; G10L 15/32; G10L 15/183;
G10L 17/21; G06F 17/2765; G06F
17/2785; G06F 3/167; G06F 17/21; G06F
17/30654; G06F 17/2881; G06F 3/30654;
G08C 2201/31
USPC ... 704/9, 10, 235, 243, 246, 270, 270.1, 275
See application file for complete search history.

(56) References Cited

U.S. PATENT DOCUMENTS

| | | | |
|---|---|---|---|
| 6,925,436 B1 | 8/2005 | Franz et al. | |
| 7,269,252 B2 | 9/2007 | Eran | |
| 7,505,907 B2 | 3/2009 | Carro | |
| 7,711,569 B2 | 5/2010 | Takeuchi et al. | |
| 7,756,868 B2 | 7/2010 | Lee | |
| 7,769,705 B1 | 8/2010 | Luechtefeld | |
| 8,126,705 B2 | 2/2012 | Aoki et al. | |
| 8,180,044 B1 | 5/2012 | McCormack et al. | |
| 8,346,757 B1 | 1/2013 | Lamping et al. | |
| 8,370,145 B2 | 2/2013 | Endo et al. | |
| 8,427,521 B2* | 4/2013 | Aaron | H04N 7/15 348/14.08 |
| 8,553,065 B2* | 10/2013 | Gannu | H04M 3/567 348/14.07 |
| 8,676,937 B2* | 3/2014 | Rapaport | H04L 51/32 709/219 |
| 8,791,977 B2* | 7/2014 | Marvit | H04N 7/15 348/14.01 |
| 9,231,990 B2* | 1/2016 | Aaron | H04N 7/15 |
| 9,635,070 B2* | 4/2017 | Aaron | H04N 7/15 |
| 2002/0099552 A1 | 7/2002 | Rubin et al. | |
| 2002/0188681 A1 | 12/2002 | Gruen et al. | |
| 2003/0055711 A1 | 2/2003 | Doherty | |
| 2003/0204399 A1 | 10/2003 | Wolf et al. | |
| 2004/0098754 A1 | 5/2004 | Vella et al. | |
| 2004/0161082 A1 | 8/2004 | Brown et al. | |
| 2004/0186712 A1 | 9/2004 | Coles et al. | |
| 2005/0234958 A1 | 10/2005 | Sipusic et al. | |
| 2005/0256905 A1 | 11/2005 | Gruhl et al. | |
| 2005/0262542 A1 | 11/2005 | De Weese et al. | |
| 2007/0011133 A1 | 1/2007 | Chang | |
| 2007/0043608 A1* | 2/2007 | May | G06Q 10/0633 705/7.27 |
| 2007/0117508 A1 | 5/2007 | Jachner | |
| 2007/0136251 A1 | 6/2007 | Colledge et al. | |
| 2007/0192103 A1 | 8/2007 | Sato et al. | |
| 2007/0260684 A1 | 11/2007 | Sharma et al. | |
| 2007/0294092 A1* | 12/2007 | Calannio | G06Q 10/06 705/321 |
| 2007/0299815 A1 | 12/2007 | Starbuck et al. | |
| 2008/0010347 A1 | 1/2008 | Houghton et al. | |
| 2008/0044048 A1 | 2/2008 | Pentland | |
| 2008/0154908 A1 | 6/2008 | Datar et al. | |
| 2008/0208820 A1 | 8/2008 | Usey et al. | |
| 2008/0281927 A1 | 11/2008 | Vanderwende et al. | |
| 2008/0300872 A1 | 12/2008 | Basu et al. | |
| 2008/0306899 A1 | 12/2008 | Gregory et al. | |
| 2009/0006982 A1 | 1/2009 | Curtis et al. | |
| 2009/0240488 A1 | 9/2009 | White et al. | |
| 2009/0282114 A1 | 11/2009 | Feng et al. | |
| 2010/0020955 A1 | 1/2010 | Wengrovitz | |
| 2010/0063815 A1 | 3/2010 | Cloran et al. | |
| 2010/0080528 A1 | 4/2010 | Yen et al. | |
| 2010/0086107 A1* | 4/2010 | Tzruya | H04M 3/2281 379/88.01 |
| 2010/0202670 A1 | 8/2010 | Tian et al. | |
| 2010/0246800 A1 | 9/2010 | Geppert et al. | |
| 2010/0251177 A1 | 9/2010 | Geppert et al. | |
| 2010/0268534 A1 | 10/2010 | Thambiratnam et al. | |
| 2011/0022967 A1 | 1/2011 | Vijayakumar et al. | |
| 2011/0035445 A1 | 2/2011 | Eickhoff | |
| 2011/0041080 A1 | 2/2011 | Fleischman et al. | |
| 2011/0064318 A1 | 3/2011 | Gao et al. | |
| 2011/0090301 A1* | 4/2011 | Aaron | H04N 7/15 348/14.08 |
| 2011/0112832 A1* | 5/2011 | Prorock | G11B 27/36 704/235 |
| 2011/0126258 A1 | 5/2011 | Emerson et al. | |
| 2011/0131144 A1 | 6/2011 | Ashour et al. | |
| 2011/0270609 A1 | 11/2011 | Jones et al. | |
| 2011/0271213 A1 | 11/2011 | Newman et al. | |
| 2012/0011158 A1 | 1/2012 | Avner et al. | |
| 2012/0046936 A1 | 2/2012 | Kandekar et al. | |
| 2012/0053936 A1* | 3/2012 | Marvit | G10L 15/26 704/235 |
| 2012/0065969 A1 | 3/2012 | DeLuca et al. | |
| 2012/0089395 A1 | 4/2012 | Chavez et al. | |
| 2012/0162363 A1 | 6/2012 | Huang et al. | |
| 2012/0191692 A1 | 7/2012 | Wang | |
| 2012/0246191 A1 | 9/2012 | Xiong | |
| 2012/0265808 A1 | 10/2012 | Ezell et al. | |
| 2012/0290950 A1* | 11/2012 | Rapaport | H04L 51/32 715/753 |
| 2012/0306993 A1 | 12/2012 | Sellers-Blais | |
| 2012/0308206 A1 | 12/2012 | Kulas | |
| 2012/0314025 A1 | 12/2012 | Fiumi | |
| 2012/0316882 A1 | 12/2012 | Fiumi | |
| 2013/0007057 A1 | 1/2013 | Li et al. | |
| 2013/0097246 A1 | 4/2013 | Zifroni et al. | |
| 2013/0176413 A1 | 7/2013 | Lowry et al. | |
| 2013/0239025 A1* | 9/2013 | Aaron | H04N 7/15 715/756 |
| 2014/0344718 A1* | 11/2014 | Rapaport | H04L 51/32 715/753 |
| 2016/0112477 A1* | 4/2016 | Aaron | H04N 7/15 709/204 |

OTHER PUBLICATIONS

Boulianne, G. et al., "Computer-assisted closed-captioning of live TV broadcasts in French", in Proceedings Interspeech 2006, Pittsburgh, USA, 2006.

'Expect Labs' [online]. "MindMeld," 2012, [retrieved on Feb. 4, 2012]. Retrieved from the Internet: <URL: www.expectlabs.com/mindmeld/> 6 pages.

Office Action issued in U.S. Appl. No. 13/750,829 dated Apr. 8, 2013, 17 pages.

Khan, Faisal M., et al. "Mining chat-room conversations for social and semantic interactions." Computer Science and Engineering, Lehigh University (2002).

Notice of Allowance issued in U.S. Appl. No. 13/743,838 dated Sep. 10, 2013, 18 pages.

Office Action issued in U.S. Appl. No. 14/078,800 dated Jan. 5, 2015, 17 pages.

Office Action issued in U.S. Application No. 14/078,800 dated Jun. 5, 2015, 20 pages.

Notice of Allowance issued in U.S. Appl. No. 14/078,800 dated May 9, 2016, 13 pages.

* cited by examiner

SPEECH RECOGNITION AND SUMMARIZATION

CROSS-REFERENCE TO RELATED APPLICATIONS

This application is a continuation of U.S. application Ser. No. 14/078,800, filed Nov. 13, 2013, which is a continuation of U.S. application Ser. No. 13/743,838 filed Jan. 17, 2013, which claims the benefit of U.S. Provisional Application No. 61/699,072, filed Sep. 10, 2012, the contents of each of which are incorporated herein by reference.

TECHNICAL FIELD

This specification generally relates to speech recognition.

BACKGROUND

In certain automated speech recognition (ASR) implementations, a user finishes speaking before recognition results are displayed or acted upon.

SUMMARY

In speech recognition and summarization, partial results can be streamed out from a recognizer while the user is speaking, thereby enabling, for example, a number of useful features for spoken language interfaces. For example, the recognizer can act on or show the user one or more contextual suggestions, such as additional information related to the topic of the user's speech (e.g., partial transcriptions, hyperlinks, maps). Along with these and other useful features, contextual suggestions can be offered substantially in real-time to augment or enhance the user's speech.

According to one general implementation of the subject matter described by this specification, a system can receive conversational speech from two or more users. The speech data can be processed to identify a topic or key words/phrases, for example, by detecting repeated words or topical words used by multiple users in the conversation, by detecting tonal characteristics of the speech (e.g., stressed words), or by detecting other characteristics. Additionally, other data (e.g., videoconference images) can also be received and processed to identify topic or key words/phrases, for example, by identifying users' body language or facial expressions as an indicator of the importance of recently spoken speech audio (e.g., a user who looks confused while another user recites a phone number may benefit from seeing a transcription of the phone number).

Described herein are techniques for speech recognition and summarization that include receiving two or more data sets each representing speech of a corresponding individual attending an internet-based social networking video conference session, decoding the received data sets to produce corresponding text for each individual attending the internet-based social networking video conference, and detecting characteristics of the session from a coalesced transcript produced from the decoded text of the attending individuals for providing context to the internet-based social networking video conference session.

Implementations of the techniques can include some, all, or none of the following features. The technique can also include detecting characteristics of the session from the two or more received data sets. The technique can also include detecting characteristics of the session attending individuals from other corresponding data sets. Detecting characteristics of the session can include monitoring at least one of the volume of the speech represented in the two or more data sets and the presented speed of the speech represented in the two or more data sets. Detecting characteristics of the session attending individuals can include detecting physical features of the attending individuals. Detecting characteristics of the session from the coalesced transcript can include at least one of detecting the temporal length of the session and detecting repetitive use of one or more words. Detecting characteristics of the session from the coalesced transcript can include detecting a topic from the content of the transcript. Detecting characteristics of the session from the two or more received data sets can include detecting an emotion of one or more of the attending individuals. The physical feature of the attending individuals can include facial expressions. Detecting repetitive use of one or more words can include associating a statistical weighting value with each of the one or more words based upon at least one of the number of detected repetitive uses of each of the one or more words and temporal length of time between the detected repetitive uses. Detecting characteristics of the session from the coalesced transcript can include associating statistical weighting values with each topic detected from the content of the transcript. Detecting characteristics of the session from the coalesced transcript can include associating statistical weighting values to one or more words associated with each topic detected from the content of the transcript. The statistical weighting value can be based at least partly on the number of the attending individuals who used the one or more words. The techniques can further comprise providing the context to one or more of the attending individuals, detecting an interaction by one or more of the attending users with the context, and detecting further characteristics of the session from the detected interaction.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The systems and techniques described here may provide one or more of the following advantages. First, a system can identify topics or important selections of information spoken during a conversation. The system can use audible or visual cues provided by one or more participants to identify words or phrases that may be of use to the participants. The system can reformat or supplement the identified topics or selections of spoken information using information obtained by using the topics or selections of spoken information as search queries. The system can augment a conversation between two or more participants by providing transcriptions of identified topics or selections of speech, or by providing information based on the identified topics or selections of speech.

The details of one or more implementations are set forth in the accompanying drawings and the description below. Other features and advantages will be apparent from the description and drawings, and from the claims.

DETAILED DESCRIPTION

This document describes systems and techniques for recognizing and summarizing speech data. In general, two or more users can participate in an audio or video conference (e.g., a voice-enabled instant messenger application, a two-way or multi-way videoconference, a telephone call) while a speech recognition system processes their speech. The speech recognition system processes speech and other data to identify topics, subjects, key words, and key phrases from the conversation, and uses that information to augment the conversation by providing the users with information that they may find useful. In an example that many people have probably experienced, one person in teleconference or videoconference may quickly blurt out a phone number or address faster than the listeners can react to capture it. In the example systems, the speech recognition system may identify what the speaker said, identify the utterance for transcription, and provide the other participants with a written transcription of the phone number or address.

Figure 1:
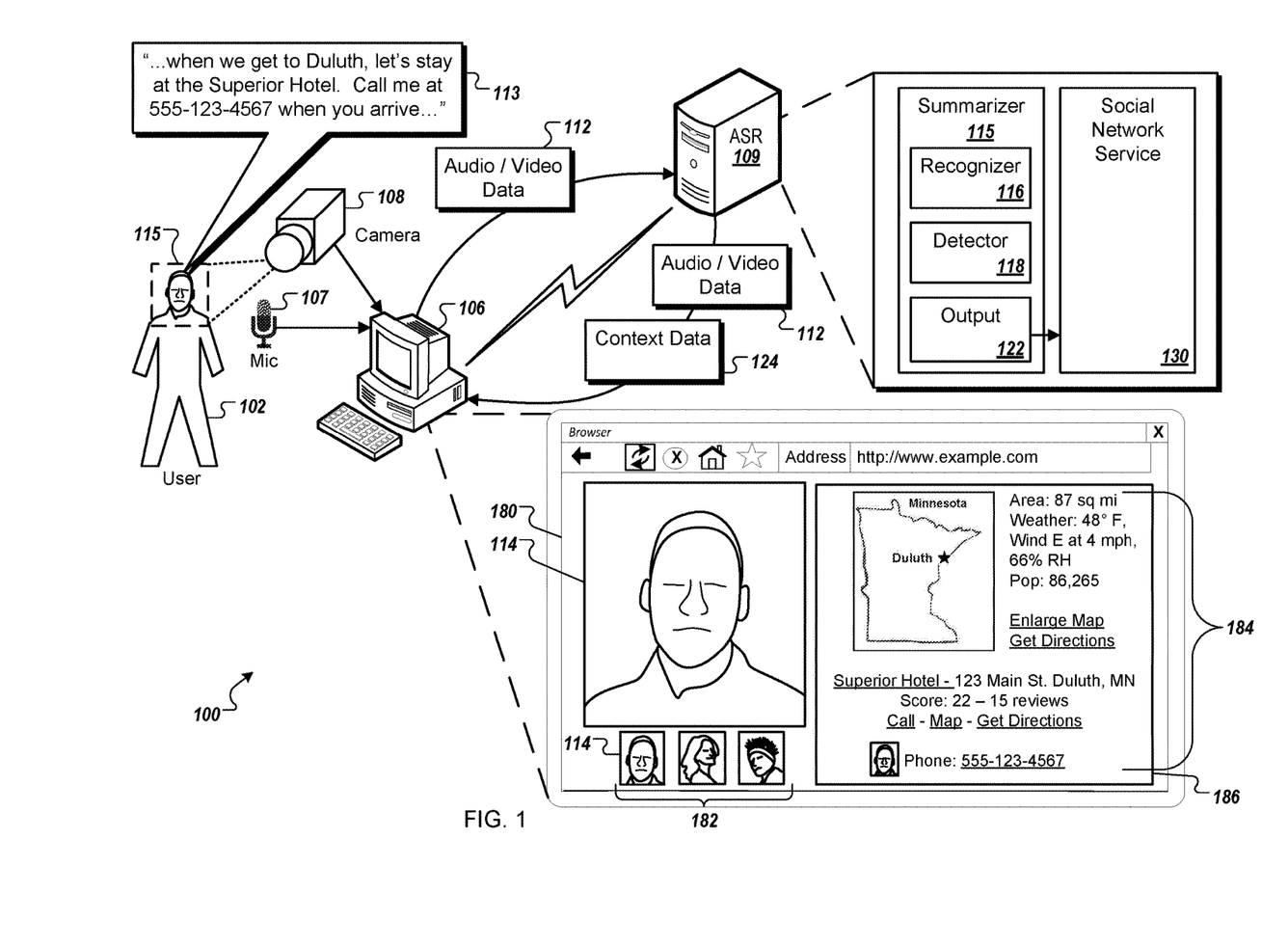
FIG. 1 is a diagram of an example system that can recognize and summarize speech data.

FIG. 1 is a diagram of an example system 100 that can recognize, summarize, and use recognized speech data. For example, the example system 100 can recognize and summarize speech data from audio and video data 112 made by a user 102 and captured by a user device 106 (e.g., a computer system) though a microphone 107 and a video camera 108 as the user 102 participates in an Internet-based social networking video conference session 180. The system 100 can identify segments that may be of interest to participants 182 in the video conference session 180, and output a collection of segments 184 to the participants 182 through a context interface 186.

Although not illustrated in FIG. 1, each of the participants 182 participates in the video conference session 180 using respective user devices 106. Each of the participants 182 sees the video conference session 180 and the collection of segments 184 presented through a respective context interface 186.

In further detail, the user device 106 is in communication with an automated speech recognition (ASR) engine 109. The user device 106 may be any appropriate type of computing device, including but not limited to a mobile phone, smart phone, PDA, music player, e-book reader, tablet computer, laptop or desktop computer, or other stationary or portable device, that includes one or more processors and computer readable media. The ASR engine 109 may be a component of the mobile device 106. In some implementations, the ASR engine 109 may be external to the user device 106, and communication between the user device 106 and the ASR engine 109 may take place over phone and/or computer networks including a wireless cellular network, a wireless local area network (WLAN) or Wi-Fi network, a Third Generation (3G) or Fourth Generation (4G) mobile telecommunications network, or any appropriate combination thereof.

Audio and video data 112 is sent to the ASR engine 109. For example, when the user 102 begins to utter a sentence (e.g. "... when we get to Duluth, let's stay at the Superior Hotel. Call me at 555-123-4567 when you arrive ..."), the utterance 113 is encoded and communicated to the ASR engine 109 as part of the audio and video data 112. Additionally, the audio and video data 112 may include images or streaming video captured using the camera 108. For example, the audio and video data 112 may include a video stream of the user's face 114.

The ASR engine 109 receives and processes the audio and video data 112. The ASR engine 109 may be configured to execute application code associated with a variety of software components (e.g., modules, objects, libraries, services, and the like) for implementing a speech summarizer 115, including a recognizer 116, a detector 118, and an output module 122. The ASR engine 109 is also in communication with an Internet-based social networking video conference service 130.

As the ASR engine 109 receives the audio and video data 112, the recognizer 116 recognizes and converts the utterance 113 into text. The text is also processed by the detector 118. In the example system 100, the detector 118 identifies topics and/or key words recognized by the recognizer 116. As described in greater detail below, the recognizer 116 can identify potentially "important" words in the utterance 113.

The output module 122 forms a collection of context data 124 from the "important" information provided by the detector 118, and provides the context data 124 to the Internet-based networking video conference service 130 which communicates them to the user device 106 through the context interface 186 as the collection of segments 184. The context data 124 may be sent to the user device 106 at pre-determined time intervals, or in real-time as segments are identified by the summarizer 115 of the ASR engine 109. In some implementations, the context data 124 and the collection of segments 184 can include text, hyperlinks, numbers, graphics, or user interface components. For example, the user 102 may speak the phone number "555-123-4567", and the string "555-123-4567" may appear among the collection of segments 184, possibly as a hyperlink that when selected will initiate a phone call using the displayed number. In another example, the user 102 may make an utterance that can be identified as a street address, and the address may appear among the collection of segments 184 as a map or text, possibly accompanied by user interface elements that can be selected to open an enlarged map view or to obtain navigational directions. In yet another example, words or phrases from the utterance 113 may be selected and used to provide knowledge graphs (e.g., a summary of information about a topic and/or links to additional information) among the collection of segments 184.

The video conference session 180 displays the collection of segments 184 that are received by the user device 106. In the example shown, the video conference session 180 incrementally displays the segments 184 as they arrive. For the example, the context interface 186 may be a scrollable window in which each of the segments 184 appears as they are identified and output to the user device 106. In such an example, the collection of segments 184 can appear as a time-ordered list of segments that the user can scroll through and interact with at a later time.

The process described above may be implemented in an appropriate network environment, with appropriate devices and computing equipment. An example of such an environment is described below.

Figure 2:
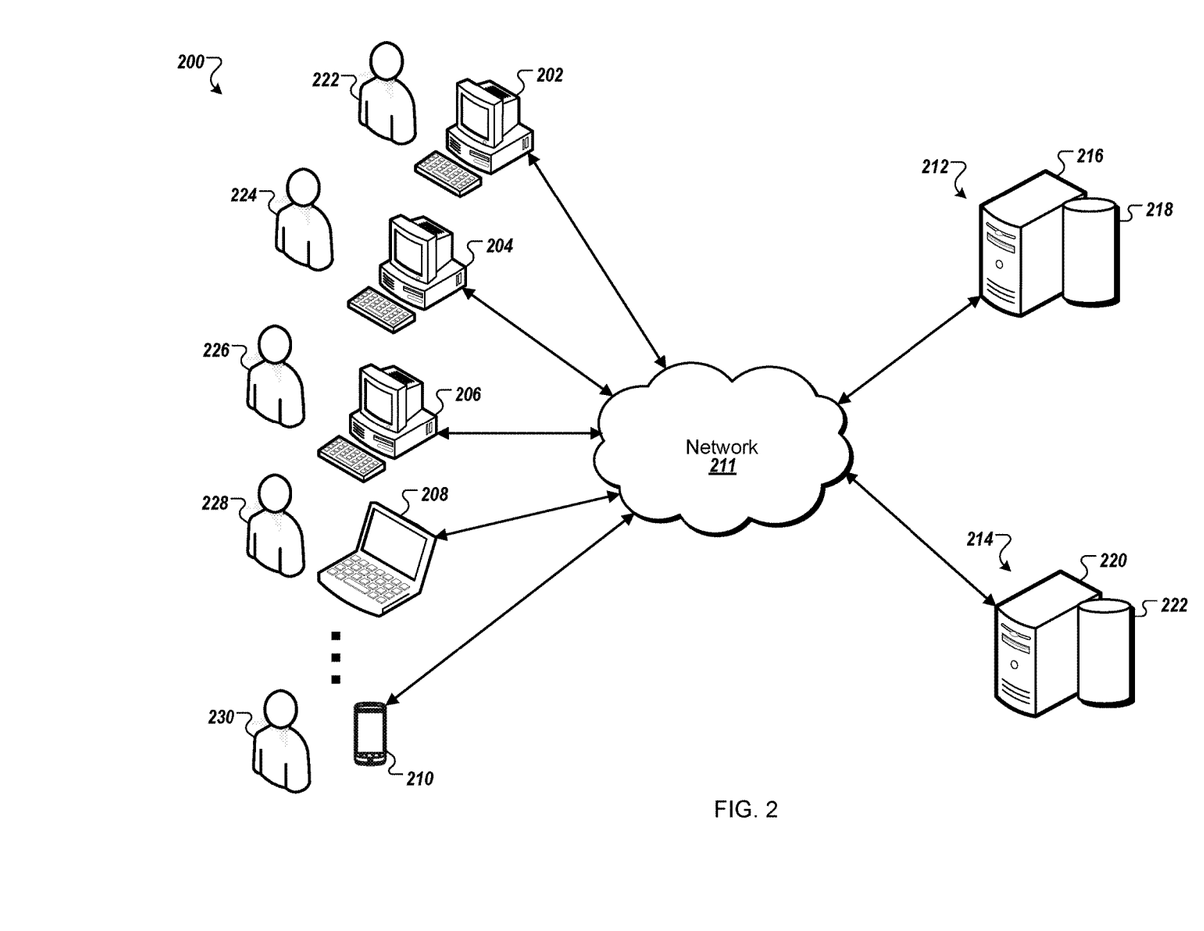
FIG. 2 is a block diagram showing an example network environment on which the process described herein for recognizing, summarizing, and using recognized speech data may be implemented.

FIG. 2 is a block diagram showing an example network environment on which the processes described herein for suggesting interaction among members of a social network may be implemented. In this regard, FIG. 2 shows an example network environment 200. Network environment 200 includes computing devices 202, 204, 206, 208, 210 that can each communicate with a first server system 212 and/or a second server system 214 over a network 211. Each of computing devices 202, 204, 206, 208, 210 has a respective user 222, 224, 226, 228, 230 associated therewith. The first server system 212 includes a computing device 216 and a machine-readable repository, or database 218. The second server system 214 includes a computing device 220 and a machine-readable repository, or database 222. Example environment 200 may include many thousands of Web sites, computing devices and servers, which are not shown.

The network 211 can include a large computer network, e.g., a local area network (LAN), wide area network (WAN), the Internet, a cellular network, or a combination thereof connecting a number of mobile computing devices, fixed computing devices, and server systems. The network(s) may provide for communications under various modes or protocols, e.g., Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Computing devices 202 to 210 enable respective users 222 to 230 to access Internet-based social networking video conference services, e.g., the Internet-based social networking video conference service 130. In some examples, users 222 to 230 can be members of a social networking service. For example, user 222 of computing device 202 can view a Web page using a Web browser. The Web page can be provided to computing device(s) 202 to 210 by server system 212, server system 214 or another server system (not shown). The Web page may be internal to the social networking service or the Web page may be a publicly accessible Web page that is not part of the social networking service, and can include features of the Internet-based social networking video conference service 130.

In example environment 200, computing devices 202, 204, 206 are illustrated as desktop-type computing devices, computing device 208 is illustrated as a laptop-type computing device 208, and computing device 210 is illustrated as a mobile computing device. In some implementations, any of the computing devices 202-210 can be the user device 106. It is appreciated, however, that computing devices 202 to 210 can each include a type of computing device, examples of which include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 3:
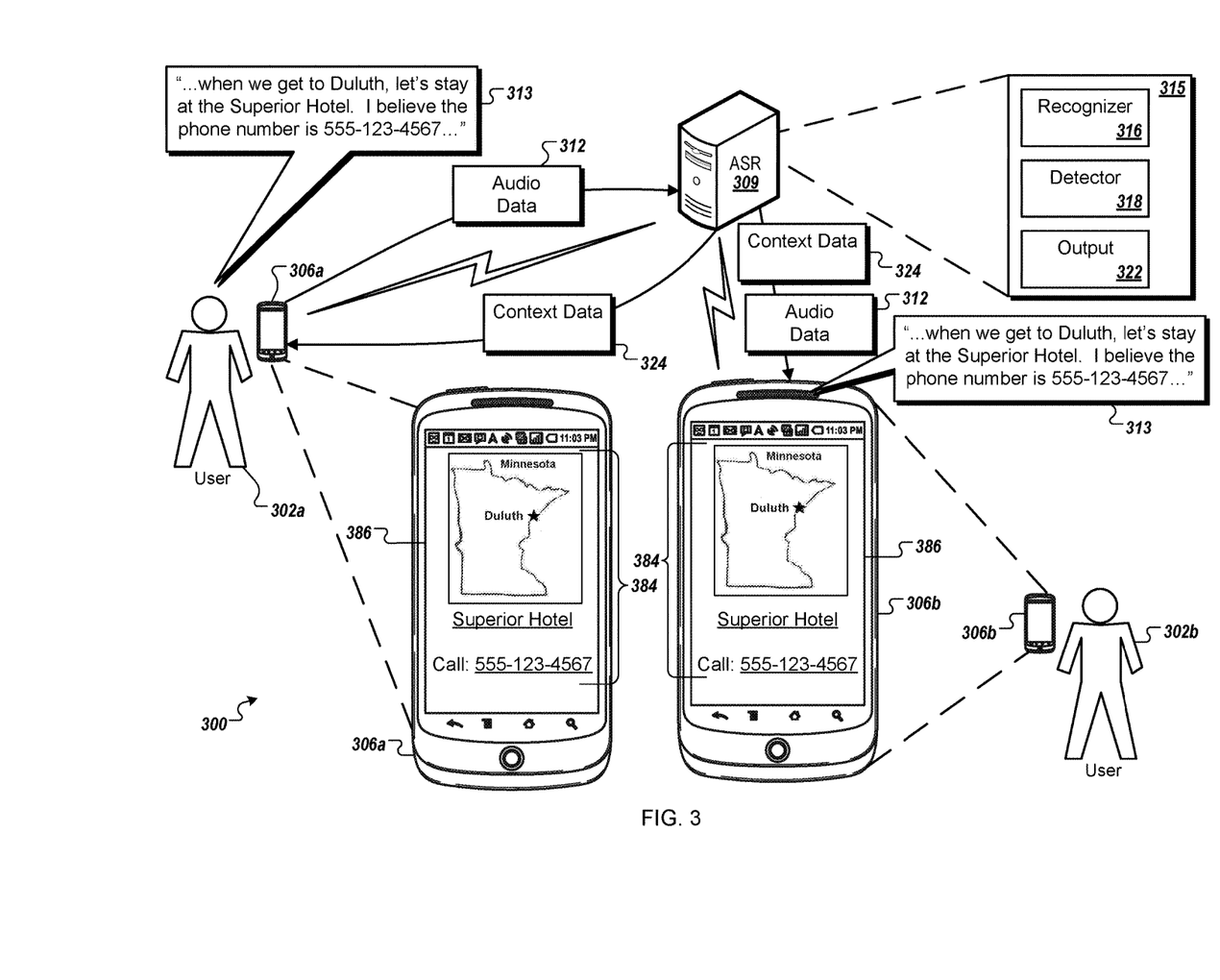
FIG. 3 is a diagram of another example system that can recognize, summarize, and use speech data.

FIG. 3 is a diagram of another example system 300 that can recognize, summarize, and use recognized speech data. Along with providing the functionality of the system 100 (presented in FIG. 1), the system 300 is adapted to provide contextual information for voice (e.g., telephone) communications between two or more users, such as a user 302a and a user 302b. For example, the example system 300 can recognize and summarize speech data from audio data 312 made by a user 302a and captured by a user device 306 as the user 302a participates in telephone call or teleconference. The system 300 can identify segments that may be of interest to the users 302a and 302b during the phone call, and output a collection of segments 384 to the users 302a, 302b through a context interface 386.

In further detail, the user devices 306a and 306b are in communication with an automated speech recognition (ASR) engine 309. The user devices 306a, 306b may be any appropriate type of computing device, including but not limited to a mobile phone, smart phone, PDA, music player, e-book reader, tablet computer, laptop or desktop computer (e.g., running a voice-over-IP or other form of audio communications application), or other stationary or portable device, that includes one or more processors and computer readable media. The ASR engine 309 may be a component of the mobile devices 306a and/or 306b. In some implementations, the ASR engine 309 may be external to the user devices 306a and/or 306b, and communication between the user devices 306a, 306b and the ASR engine 309 may take place over phone and/or computer networks including a wireless cellular network, a wireless local area network (WLAN) or Wi-Fi network, a Third Generation (3G) or Fourth Generation (4G) mobile telecommunications network, or any appropriate combination thereof.

Audio data 312 is sent to the ASR engine 309. For example, when the user 302a begins to utter a sentence (e.g. " . . . when we get to Duluth, let's stay at the Superior Hotel. Call me at 555-123-4567 when you arrive . . . "), the utterance 313 is encoded and communicated to the ASR engine 309 as part of the audio data 312.

The ASR engine 309 receives and processes the audio data 312. The ASR engine 309 may be configured to execute application code associated with a variety of software components (e.g., modules, objects, libraries, services, and the like) for implementing a speech summarizer 315, including a recognizer 316, a detector 318, and an output module 322.

As the ASR engine 309 receives the audio data 312, the recognizer 316 recognizes and converts the utterance 313 into text. The text is also processed by the detector 318. In the example system 300, the detector 318 identifies topics and/or key words recognized by the recognizer 316. As described in greater detail below, the recognizer 316 can identify potentially "important" words in the utterance 313.

The output module 322 forms a collection of context data 324 from the "important" information provided by the detector 318, and provides the context data 324 to the user devices 306a and 306b through the context interface 386 as the collection of segments 384. The context data 324 may be sent to the user devices 306a, 306b at pre-determined time intervals, or in real-time as segments are identified by the summarizer 315 of the ASR engine 309. In some implementations, the context data 324 and the collection of segments 384 can include text, hyperlinks, numbers, graphics, or user interface components. For example, the user 302a may speak the phone number "555-123-4567", and the string "555-123-4567" may appear among the collection of segments 384, possibly as a hyperlink that when selected will initiate a phone call using the displayed number. In another example, the user 302a may make an utterance that can be identified as a street address, and the address may appear among the collection of segments 384 as a map or text, possibly accompanied by user interface elements that can be selected to open an enlarged map view or to obtain navigational directions. In yet another example, words or phrases from the utterance 313 may be selected and used to provide knowledge graphs (e.g., a summary of information about a topic and/or links to additional information) among the collection of segments 384.

Context interfaces 386 display the collection of segments 384. In the example shown, the context interfaces 386 incrementally display the segments 384 as they arrive. For the example, the context interfaces 386 may be scrollable windows in which each of the segments 384 appears as they are identified and output to the user device 306a, 306b. In such an example, the collection of segments 384 can appear as a time-ordered list of segments that the user can scroll through and interact with at a later time.

Figure 4:
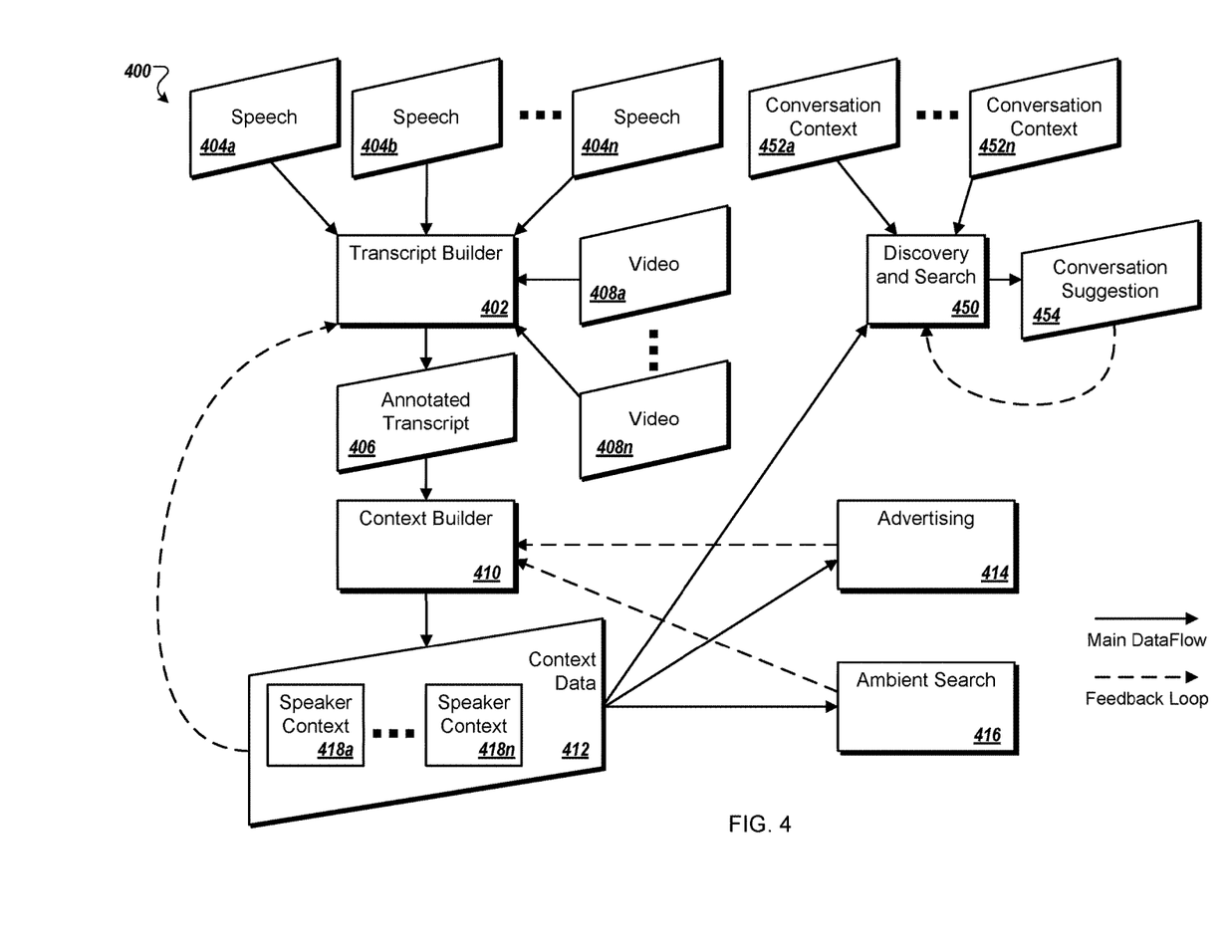
FIG. 4 is a flow diagram of an example process recognizing, summarizing, and using recognized speech data.

FIG. 4 is a block diagram of an example process 400 for recognizing, summarizing, and using the recognized speech data. In some implementations, the process 400 can be used by an ASR such as the ASR 109 and/or ASR 309.

In the illustrated example, a transcript builder 402 receives a collection of speech data 404a, 404b, and 404n from a collection of users. For example, the collections of speech data 404a-404n can be digitized samples of user speech (e.g., the utterance 113) each spoken by a different user, and captured and converted by the user devices 106, 306a, 306b or the ASRs 109, 309. The transcript builder 402 processes the speech data 404a-404n to identify words and phrases and convert the words and phrases to text.

The transcript builder 402 also provides annotation data along with the transcribed text to form an annotated transcript 406. The annotated transcript 406 includes data that describes attributes of the transcribed text. For example, the annotated transcript 406 can indicate that a particular phrase had been used or repeated by multiple users in the conversation (e.g., thereby inferring that the phrase may have been of importance in the conversation). In another example, the annotated transcript 406 can indicate that a particular phrase had been spoken with emphasis (e.g., spoken loudly, spoken at a different rate, spoken with a different pitch or tone, spoken with different enunciation). In another example, the annotated transcript 406 can indicate that a particular phrase had been spoken in the context of other words of phrases that may indicate importance (e.g., "this is important", "write this down . . . ", "don't forget . . . ", "make sure . . . ").

The transcript builder 402 receives a collection of video data 408a-408n. Each collection of video data 408a-408n corresponds to a respective collection of the speech data 404a-404n. For example, the speech data 404a and the video data 408a may be the audio and video parts of a user's video conference feed in an Internet-based social networking video conference session.

The transcript builder 402 processes the video data 408a-408n along with the speech data 404a-404n to determine additional annotation information that can be included in the annotated transcript 406. For example, the physical movements or facial expressions of a user who is currently speaking can indicate that the speaker is putting particular emphasis upon a particular segment of he is saying (e.g., and therefore the segment may be a good candidate for presentation as contextual information). In another example, the physical movements or facial expressions of a user who is currently listening to a segment of speech can indicate that the listener is particularly interested in or confused by what is being said (e.g., and therefore one or more of the listeners may benefit from having the segment transcribed and provided as context data).

A context builder 410 uses the annotated transcript 406 to build segments of contextual information. In some implementations, the context builder 410 can identify segments of transcribed speech data and provide them as a collection of context data 412. For example, the context builder 410 may identify a segment of the annotated transcript as an email address and provide the transcribed email address as context data; furthermore, the context builder 410 may reformat the email address as a hyperlink (e.g., mailto: user@example.com) and provide the link as context data. In some implementations, the context data 412 can be the context data 124 or 324.

In some implementations, the context builder 410 can use annotations in the annotated transcript 406 to identify information that can be provided at context data. For example, a speaker may say, "whatever happens, we all need to be finished by NINE O'CLOCK in the morning," (e.g., saying the time with emphasis that is noted in the annotations). The context builder 410 may identify that the words "nine o'clock" were stressed, and provide "9:00 am" as context data.

The context builder 410 also receives advertising data from an advertising module 414. The advertising module 414 identifies textual, graphical, and/or multimedia advertising content based on the context data 412, and provides the advertising content to the context builder 410. For example, the annotated transcript 406 may include a discussion about an upcoming family vacation to "Walley World". As a result, the term "Walley World" may appear among the context data 412. The advertising module 414 may use this term to identify an advertisement for "Walley World" and provide the ad to the context builder 410, which can in turn incorporate the advertisement into the context data 412.

The context builder 410 also receives search data from an ambient search module 416. The ambient search module 416 performs Internet and/or other informational search queries based at least in part upon the context data 412, and provides the results as the search data to the context builder 410. In some implementations, the ambient search module 416 can provide knowledge graphs or other summaries of information obtained as context data. For example, the context data 412 may include the phrase "Veterans Day", and the ambient search module 416 may perform searches to identify information about Veterans Day, such as the history of the holiday and the date of its next occurrence (e.g., in the U.S., Veterans Day is observed on the weekday closest to November 11 each year).

In some implementations, the context builder 410 can perform other functions to create the context data 412. For example, a phrase may be identified as a physical address or landmark, and the context builder 410 can provide a hyperlink to a map, a map image, navigation directions, information about the address (e.g., current time, weather conditions), or combinations of these and other appropriate information that can describe an address or landmark. In another example, a phrase may be identified as a telephone number, and the context builder 410 can provide the phone number as a hyperlink or other user interface element that can be used to initiate a telephone call to the number.

In another example, the phrase "let's plan to meet at my house next Friday at 8 pm," can be processed by the context builder to create a meeting or event invitation. The sub-phrase "next Friday at 8 pm" can be processed to identify a calendar date and time to be associated with the event. The sub-phrase "at my house" can be processed to identify a location based on information known about the user who spoke the phrase (e.g., the speaker's home address may be drawn from public profile information). The sub-phrase "let's" may be processed to infer a guest list for the event (e.g., "let's" may imply that all the participants in the conversation can be included as guests). Participants can click the invitation to populate their calendar with the event, which may include the date, time, location, and/or guest list.

The context data 412 includes a collection of speaker contexts 418a-418n. Each of the speaker contexts 418a-418n corresponds to one of the collections of speech data 404a-404n (e.g., each participant in the conversation has a speaker context associated with them). For example, two participants in a conversation may be debating over where to take a vacation; one participant may suggest a trip to Sweden while the other may suggest a trip to Japan. While the overall context data 412 of the conversation may be identified by the context builder 410 as pertaining to "travel", the speaker context 418a of one participant may pertain to "Sweden travel" while the speaker context 418n of the other participant may pertain to "Japan travel".

In some implementations, the context data 412 may be tailored to each participant in a conversation. For example, a speaker may say to a listener, "my phone number is 555-123-4567". The context builder 410 may identify the speaker and the listener and provide each with different context data, such as by providing a transcript of the phone number to the listener but not to the speaker (e.g., the speaker already knows the phone number and therefore may not benefit from seeing a transcription).

The context data 412 is provided to the transcript builder 402. In some implementations, the transcript builder 402 can use the context data 412 to improve the transcription of the speech data 404a-404n. For example, at the start of a conversation the topic or context of the conversation may be unknown to the transcript builder 402, and the transcript builder 402 may transcribe the speech data 404a-404n using a general purpose transcription engine. As the conversation progresses, the context builder 410 may identify context data 412 that can help identify the context of topic of the conversation. Based on the context data 412, the transcript builder 402 may be able to select one or more special purpose (e.g., topic specific) transcription engines that may be used to identify and transcribe words that may not commonly be used in everyday speech.

For example, a group of doctors may use an Internet-based social networking video conference session to identify the treatment that should be used for a particular patient. At the start of the conversation, the transcript builder 402 may use a general purpose transcription engine to identify words such as "doctor", "St. Olaf Hospital", "treatment", "medication", and "cancer", but such a general purpose transcription engine may not be able to identify medical terminology used to describe things such as anatomy, pathogens, or pharmaceuticals. The context builder 410 can use this information to generate the context data 412, which may initially include general context information such as a segments that provides a map to "St. Olaf Hospital". The transcript builder 402 can use the context data 412 to determine that the conversation is about medicine, and respond by engaging a medical transcription engine that is able to identify and transcribe medical terminology. For example, the transcript builder 402 may now be able to transcribe the term "methotrexate" (e.g., a cancer drug) which the context builder 410 can use to engage the ambient search module 416 to obtain related information such as brand names, medical dictionary definitions, known side effects, or other appropriate information that may be useful in the form of context data 412 that may be provided to the participants in the conference.

The context data 412 is also provided to a conversation discovery and search module 450. The discovery and search module 450 identifies and suggests conversations (e.g., other Internet-based social networking video conference sessions) that may be contextually similar to the one being processed by the context builder 410. For example, the discovery and search module 450 can help users find other conversations that they might be interested to join.

The discovery and search module 450 receives a collection of conversation context data 452a-452n. The conversation context data 452a-452n are collections of context data, such as the context data 412, generated from other conversations taking place among other users. The discovery and search module 450 compares the context data 412 to the conversation context data 452a-452n to identify other (e.g., contextually similar) conversations that may be of interest to users. The identified conversations are provided as one or more conversation suggestions 454. In some implementations, the conversation suggestions 454 can be provided to users to allow them to join one of the suggested conversations. For example, the conversation suggestions 454 can be provided as one or more hyperlinks that can be selected to join the user to the selected conversation.

The conversation suggestions 454 are provided back to the discovery and search module 450 to further refine the process of identifying additional suggestions. For example, by selecting one of the conversation suggestions 454, the user may trigger feedback that can indicate to the discovery and search module 450 that the suggestion was a good one.

Figure 5:
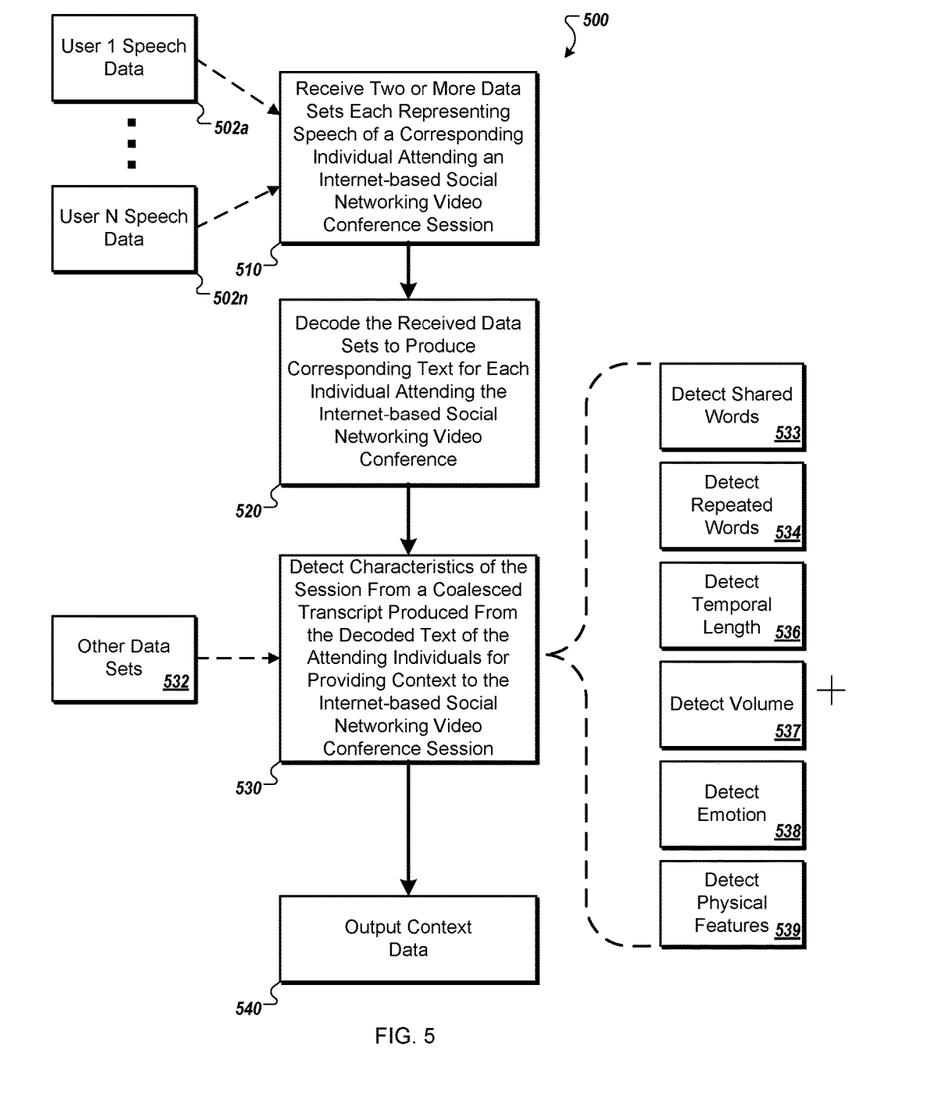
FIG. 5 is a flow diagram of an example process for recognizing, summarizing, and using recognized speech data.

FIG. 5 is a flow chart of another example process 500 for the recognition, summarization, and use of recognized speech data. In some implementations, the process 400 can be used by the ASR 109 and/or ASR 309. In the example of the process 500, a collection of speech data sets 502a-502n are provided, for example, by capturing and digitizing the speech utterances of one or more users (e.g., the user 102) by user devices (e.g., the user device 106).

Two or more data sets (e.g., the speech data sets 502a-502n), each representing speech of a corresponding individual attending an internet-based social networking video conference session are received (510). For example, the ASR 109 can receive the audio and video data 112 from the user device 106, in which the audio and video data 112 includes a representation of the utterance 113 made by the user 102.

The received data sets are decoded to produce corresponding text for each individual attending the internet-based social networking video conference (520). For example, the recognizer 116 can transcribe the audio and video data 112.

Characteristics of the session are detected from a coalesced transcript produced from the decoded text of the attending individuals for providing context to the internet-based social networking video conference session (530).

In some implementations, characteristics of the session can be detected from the two or more received data sets. In some implementations, detecting characteristics of the session can include monitoring at least one of the volume of the speech represented in the two or more data sets and the presented speed of the speech represented in the two or more data sets. For example, the sets of user speech data 502a-502n can each be audio data representing the speech of respective users. The speech data 502a-502n can be processed individually or in combination to identify characteristics of each user's speech and/or characteristics of the conversation as a whole. For example, an individual user's speech may place additional levels of stress or emphasis on some words than may be placed on others (e.g., the user may say some things detectably louder or in a different tone), and these levels may be identified as characteristics of the session. In another example, the speech patterns of two or more conversation participants may alter in response to emphasized or important utterances (e.g., the users may speak relatively loudly or rapidly, or may overlap each other during a heated debate), and these patterns may be identified as characteristics of the conversation.

In some implementations, characteristics of the session attending individuals can be detected from other corresponding data sets, such as a data set 532. For example, the data set 532 can include video data, such as a video data portion of the audio and video data 112 captured by the camera 108. In some implementations, detecting characteristics of the session attending individuals can include detecting physical features of the attending individuals. A physical features detection process 539 may be used to analyze the physical features of a user as captured by video data. In some implementations, the physical feature can be the attending individual's facial expressions. For example, if the user 102 is detected to be unusually wide-eyed, the detector module 118 may determine that the user is emphasizing something currently being said. In another example, the user 102 may furl his brow while listening to another user speak (e.g., an address, a complicated series of numbers, a name with a difficult spelling), and the detector module 118 may determine that the user is concerned or confused by what is being said. In these and other examples, the summarizer 115 may use the detected characteristics to identify and provide segments as context data 124 that may be useful to the attending individuals. For example, the confused user of the previous example may benefit from seeing a transcript of the segment of speech that was spoken at approximately the time when the user furled his brow.

In some implementations, detecting characteristics of the session from the coalesced transcript can include at least one of detecting the temporal length of the session and detecting repetitive use of one or more words. A repeated words detection process 534 can be used to detect when various words or phrases have been used multiple times during the course of a conversation. For example, a user may speak a particular word or phrase several times during a conversation, and the repeated word or phrase may be annotated to indicate the possible contextual importance of the repeated utterance (e.g., the phrase was repeated because it may be the topic of the conversation, or may have been repeated to emphasize its importance).

In another example, two or more participants in a conversation may commonly use a particular word or phrase during a conversation, and the commonly used word or phrase may be identified to indicate its possible contextual importance. For example, when the word or phrase is used by multiple attending individuals, it may be inferred that the word or phrase may be of importance in the conversation and therefore may be annotated to reflect its possible importance in the context of the conversation.

A temporal length detection process 536 can be used to detect the duration of various utterances during the course of a conversation. For example, when a user is detected as speaking substantially interrupted for extended periods (e.g., the speaker is giving a presentation or lecture), that user's speech may be annotated to reflect possible importance to the other users.

In some implementations, detecting characteristics of the session from the coalesced transcript can include detecting the volume of one or more users' speech. A volume detection process 537 can be used to detect volume characteristics associated with various utterances. For example, if a user speaks a particular phrase more loudly than others, the detector 118 may annotate the respective transcription of the phrase to reflect the emphasis with which it was spoken. Since the phrase was detected as being said with emphasis, the phrase may be selected to be provided as context data for the individuals attending the conversation.

In some implementations, detecting characteristics of the session from the two or more received data sets can include detecting an emotion of one or more of the attending individuals. For example, a user's choice of words, patterns of speech (e.g., speed, volume, pitch, pronunciation, voice stress), gestures, facial expressions, physical characteristics, body language, and other appropriate characteristics can be detected by an emotion detection process 538 to estimate the user's emotional state. In some implementations, a user's emotional state can be used to identify information that may be useful to the user as context data. For example, a listener may look or act excited upon hearing information from a speaker (e.g., "I am buying you a new 'SuperDuper X' phone"), and the summarizer 115 may use the listener's emotional reaction as a cue to supply the listener with context data relating to what the speaker said (e.g., product information for the 'SuperDuper X' phone).

In some implementations, detecting characteristics of the session from the coalesced transcript can include detecting a topic from the content of the transcript. For example, during the course of a conversation, many words and phrases may be used, with many of them not necessarily being important to the core subject of the discussion. The detector 118 may analyze the words and phrases and identify one or more topics to which they may pertain. Once the likely topic(s) of the conversation have been identified, the detector 118 may detect additional topical words in the transcription and annotate them as being potentially relevant to the topic of the conversation. In such examples, words and phrases that pertain to the topic of the conversation can be used identify context data that may be useful to the attending individuals during the course of their discussion.

In some implementations, detecting characteristics of the session from the coalesced transcript can include detecting repetitive use of one or more words and associating a statistical weighting value with each of the one or more words based upon at least one of the number of detected repetitive uses of each of the one or more words and temporal length of time between the detected repetitive uses. For example, when a word is spoken and identified repeatedly during a conversation, additional statistical weight may be associated with the word (e.g., when a user speaks a word repeatedly, the word may have special importance in the context of the conversation). In some implementations, the statistical weighting value can be based at least partly on the number of the attending individuals who used the one or more words. For example, when multiple participants in a conversation are detected as having spoken a common word or phrase, that word or phrase may be given additional statistical weight (e.g., when more than one user speaks a common word, the word may have special importance in the context of the conversation).

In some implementations, detecting characteristics of the session from the coalesced transcript can include associating statistical weighting values with each topic detected from the content of the transcript. For example, the words "shutter", "f-stop", "aperture" and "focus" can be recognized as a photography domain. In some examples, assigning additional statistical weight to topic domains associated with detected characteristics can be used is to increase speech recognition accuracy based on identification of several words within the same domain. For example, speech recognition can include assigning probabilities to various candidate words that are identified as being possible transcriptions for a spoken word. In one example, the word "f-stop" in isolation may have a low probability since it's not a commonly used phrase in everyday conversation, and a phrase like "bus stop" may generally be a more likely candidate. However, in a conversation containing other words such as "aperture" and "focus", the phrase "f-stop" may be given a higher probability as a candidate transcription.

In another example, the words "shutter", "f-stop", "aperture" and "focus" can be recognized as a photography domain. In response, an increased statistical weighting value can be associated with the topic of "photography". In such examples, the statistical weighting value associated with a topic can be used to identify relevant information that can be provided to participants in the conversation. For example, by identifying the topic of "photography", and detecting the spoken use of the word "lens", information about camera lenses rather than eyeglass lenses may be identified and provided to the attending individuals.

Figure 6:
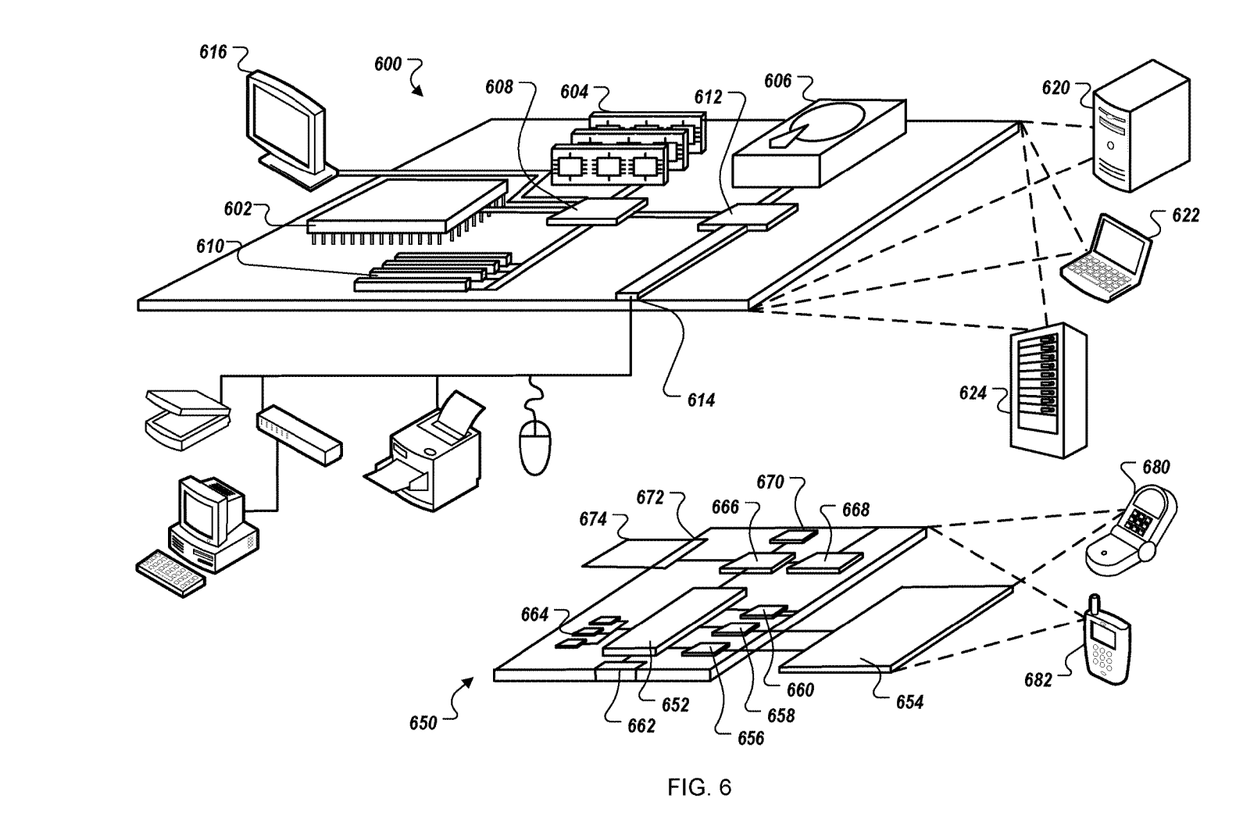
FIG. 6 is a block diagram of computing devices that may be used to implement the systems and methods described in this document.

FIG. 6 is a block diagram of computing devices 600, 650 that may be used to implement the systems and methods described in this document, either as a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, by a videoconference system that includes an automated speech recognizer and a context builder and from a first computing device that includes a microphone, speech data representing an utterance spoken by a particular participant of a video conference and captured by the microphone of the first computing device;
transcribing, by the automated speech recognizer of the video-conference system, the speech data representing the utterance spoken by the particular participant of the video conference into text in real-time;
determining, by the automated speech recognizer of the videoconference system, a topic of the video conference by analyzing one or more words and/or phrases in the text of the speech data;
annotating, by the automated speech recognizer of the videoconference system, the text of the speech data by:
determining one or more relevant terms in the text of the speech data as being potentially relevant to the determined topic; and
identifying, using the one or more relevant terms in the text, one or more resources associated with the determined topic of the video conference, each identified resource comprising at least one of advertising content, a search result, an event, or a location; and
for each identified resource:
generating, using the context builder of the video conference system, a user interface component for the identified resource; and
outputting, by the context builder of the video conference system, the corresponding user interface component for the identified resource to a second computing device in real-time, the corresponding user interface component when received by the second computing device causing the second computing device to display the corresponding user interface component on a videoconference graphical user interface executing on the second computing device.

2. The computer-implemented method of claim 1, wherein identifying one or more resources associated with the determined topic of the video conference comprises obtaining, from an advertising module, the advertising content that corresponds to the determined topic of the video conference.

3. The computer-implemented method of claim 1, wherein identifying one or more resources associated with the determined topic of the video conference comprises:
obtaining, from a search engine, one or more search results that are identified as a result of performing a query using at least one of the one or more relevant terms in the text of the speech data representing the utterance spoken by the particular participant of the video conference; and
selecting a particular search result from among the one or more search results identified as the result of performing the query.

4. The computer-implemented method of claim 1, wherein generating the corresponding user interface component for the identified resource comprises:
identifying the event associated with the determined topic of the video conference; and
generating an invitation for the identified event, the invitation comprising at least one of a calendar date, time, location, or guest list for the identified event.

5. The computer-implemented method of claim 1, wherein generating the corresponding user interface component for the identified resource comprises:
identifying the location associated with the determined topic of the video conference; and
generating a map image associated with the identified location.

6. The computer-implemented method of claim 1, wherein generating the corresponding user interface component for the identified resource comprises:
identifying the location associated with the determined topic of the video conference; and
generating a hyperlink to a map associated with the identified location.

7. A system comprising:
one or more computers and one or more storage devices storing instructions that are operable, when executed by the one or more computers, to cause the one or more computers to perform operations comprising:
receiving, by a videoconference system that includes an automated speech recognizer and a context builder and from a first computing device that includes a microphone, speech data representing an utterance spoken by a particular participant of a video conference and captured by the microphone of the first computing device;
transcribing, by the automated speech recognizer of the video-conference system, the speech data representing the utterance spoken by the particular participant of the video conference into text in real-time;
determining, by the automated speech recognizer of the videoconference system, a topic of the video conference by analyzing one or more words and/or phrases in the text of the speech data;
annotating, by the automated speech recognizer of the videoconference system, the text of the speech data by:
determining one or more relevant terms in the text of the speech data as being potentially relevant to the determined topic; and
identifying, using the one or more relevant terms in the text, one or more resources associated with the determined topic of the video conference, each identified resource comprising at least one of advertising content, a search result, an event, or a location; and
for each identified resource:
generating, using the context builder of the video conference system, a corresponding user interface component for the identified resource; and
outputting, by the context builder of the video conference system, the corresponding user interface component for the identified resource to a second computing device in real-time, the corresponding user interface component when received by the second computing device causing the second computing device to display the corresponding user interface component on a videoconference graphical user interface executing on the second computing device.

8. The system of claim 7, wherein identifying one or more resources associated with the determined topic of the video conference comprises obtaining, from an advertising module, the advertising content that corresponds to the determined topic of the video conference.

9. The system of claim 7, wherein identifying one or more resources associated with the determined topic of the video conference comprises:
   obtaining, from a search engine, one or more search results that are identified as a result of performing a query using at least one of the one or more relevant terms in the text of the speech data representing the utterance spoken by the particular participant of the video conference; and
   selecting a particular search result from among the one or more search results identified as the result of performing the query.

10. The system of claim 7, wherein generating the corresponding user interface component for the identified resource comprises:
    identifying the event associated with the determined topic of the video conference; and
    generating an invitation for the identified event, the invitation comprising at least one of a calendar date, time, location, or guest list for the identified event.

11. The system of claim 7, wherein generating the corresponding user interface component for the identified resource comprises:
    identifying the location associated with the determined topic of the video conference; and
    generating a map image associated with the identified location.

12. The system of claim 7, wherein generating the corresponding user interface component for the identified resource comprises:
    identifying the location associated with the determined topic of the video conference; and
    generating a hyperlink to a map associated with the identified location.

13. A computer-readable storage device storing software comprising instructions executable by one or more computers which, upon such execution, cause the one or more computers to perform operations comprising:
    receiving, by a videoconference system that includes an automated speech recognizer and a context builder and from a first computing device that includes a microphone, speech data representing an utterance spoken by a particular participant of a video conference and captured by the microphone of the first computing device;
    transcribing, by the automated speech recognizer of the video-conference system, the speech data representing the utterance spoken by the particular participant of the video conference into text in real-time;
    determining, by the automated speech recognizer of the videoconference system, a topic of the video conference by analyzing one or more words and/or phrases in the text of the speech data;
    annotating, by the automated speech recognizer of the videoconference system, the text of the speech data by:
       determining one or more relevant terms in the text of the speech data as being potentially relevant to the determined topic; and
       identifying, using the one or more relevant terms in the text, one or more resources associated with the determined topic of the video conference, each identified resource comprising at least one of advertising content, a search result, an event, or a location; and
    for each identified resource:
       generating, using the context builder of the video conference system, a corresponding user interface component for the identified resource; and
       outputting, by the context builder of the video conference system, the corresponding user interface component for the identified resource to a second computing device in real-time, the corresponding user interface component when received by the second computing device causing the second computing device to display the corresponding user interface component on a videoconference graphical user interface executing on the second computing device.

14. The computer-readable storage device of claim 13, wherein identifying one or more resources associated with the determined topic of the video conference comprises:
    obtaining, from a search engine, one or more search results that are identified as a result of performing a query using at least one of the one or more relevant terms in the text of the speech data representing the utterance spoken by the particular participant of the video conference; and
    selecting a particular search result from among the one or more search results identified as the result of performing the query.

15. The computer-readable storage device of claim 13, wherein generating the corresponding user interface component for the identified resource comprises:
    identifying the event associated with the determined topic of the video conference; and
    generating an invitation for the identified event, the invitation comprising at least one of a calendar date, time, location, or guest list for the identified event.

16. The computer-readable storage device of claim 13, wherein generating the corresponding user interface component for the identified resource comprises:
    identifying the location associated with the determined topic of the video conference; and
    generating map image associated with the identified location.

17. The computer-readable storage device of claim 13, wherein generating the corresponding user interface component for the identified resource comprises:
    identifying the location associated with the determined topic of the video conference; and
    generating a hyperlink to a map associated with the identified location.

* * * * *